US012799001B2

(12) United States Patent
Wong

(10) Patent No.: US 12,799,001 B2
(45) Date of Patent: Nov. 17, 2026

(54) TERAHERTZ WATER QUALITY ACTIVATOR

(71) Applicant: Terahertz (Shenzhen) Health Industry Co., Ltd., Shenzhen (CN)

(72) Inventor: Jun Xian Wong, Seri Kembangan (MY)

(73) Assignee: Terahertz (Shenzhen) Health Industry Co., Ltd., Shenzhen (CN)

( * ) Notice: Subject to any disclaimer, the term of this patent is extended or adjusted under 35 U.S.C. 154(b) by 403 days.

(21) Appl. No.: 18/628,931

(22) Filed: Apr. 8, 2024

(65) Prior Publication Data

US 2025/0250183 A1 Aug. 7, 2025

(30) Foreign Application Priority Data

Feb. 1, 2024 (CN) ......................... 202420251332.6

(51) Int. Cl.
*C02F 1/30* (2023.01)
*C02F 1/02* (2023.01)
*H01S 4/00* (2006.01)

(52) U.S. Cl.
CPC .................. *C02F 1/30* (2013.01); *C02F 1/02* (2013.01); *C02F 2201/002* (2013.01); *C02F 2201/008* (2013.01)

(58) Field of Classification Search
CPC .. C02F 1/00; C02F 1/001; C02F 1/002; C02F 1/005; C02F 1/02; C02F 1/30; C02F 1/32; C02F 1/46; C02F 1/461; C02F 1/46104; C02F 1/48; C02F 1/487; C02F 2201/00; C02F 2201/002; C02F 2201/32; C02F 2201/46; C02F 2201/48; C02F 2201/322; C02F 1/325; C02F 1/302; C02F 9/00; C02F 2303/04; C02F 2301/08; G01N 21/3581; G01N 21/3586; G01N 21/3577; H01S 4/00; H01S 2302/00; H01S 2302/02; H10F 30/00; H10F 30/10; A61L 2/00; A61L 2/16; A61L 2/18; A61L 2/20; A61L 2/24; A61L 11/00; A61L 2202/00; A61L 2202/10;
(Continued)

(56) References Cited

FOREIGN PATENT DOCUMENTS

CN 212849887 U * 3/2021
CN 113080688 A * 7/2021 ............ A47J 27/002
(Continued)

*Primary Examiner* — Allison G Fitzsimmons
(74) *Attorney, Agent, or Firm* — Birchwood IP

(57) ABSTRACT

A terahertz water quality activator is provided, which includes a heating base and a top cover. A middle of an upper surface of the heating base is fixedly connected to a water storage tank, a middle of an inner bottom surface of the water storage tank is fixedly connected to a heating plate. An interior of the heating plate is fixedly connected to a heating wire. In the present disclosure, during an actual use, to-be-purified water is poured into the interior of the water storage tank by a user, then a terahertz transmitter is started to emit terahertz signals to water flow, thereby changing microstructure of the water flow and improving its physical and chemical properties. At the same time, quality and activity of the water can also be evaluated. Meanwhile, a power plug, in cooperation with the power cord transfers current to the heating plate through a connector.

7 Claims, 5 Drawing Sheets

(58) Field of Classification Search
CPC ............. A61L 2202/11; A61L 2202/14; A61L 2202/16; A61L 2202/17
See application file for complete search history.

(56) References Cited

FOREIGN PATENT DOCUMENTS

| | | | | | |
|---|---|---|---|---|---|
| CN | 114081336 | A | * | 2/2022 | .............. A47J 47/01 |
| CN | 117137308 | A | * | 12/2023 | ............ A47J 27/002 |

* cited by examiner

TERAHERTZ WATER QUALITY ACTIVATOR

CROSS-REFERENCE TO RELATED APPLICATIONS

This application claims priority to Chinese Patent Application No. 202420251332.6, filed on Feb. 1, 2024, which is hereby incorporated by reference in its entirety.

TECHNICAL FIELD

The present disclosure relates to the field of water quality treatment equipment technologies, and in particular, to a terahertz water quality activator.

BACKGROUND

Terahertz water quality activator is a device that uses terahertz radiation technology to detect and treat water. Its main principle is to use electromagnetic waves within a terahertz wavelength range to act on water molecules, which causes the water molecules to undergo microscopic structural changes, thereby improving physical and chemical properties of the water. Specifically, the terahertz water quality activator emits terahertz radiation, hydrogen and ion bonds in water was caused to vibrate and rotate, thereby accelerating activation, dissociation, and recombination of water molecules, promoting interactions and chemical reactions between water molecules. In addition, the terahertz water quality activator can also detect dissolved oxygen, pH value, conductivity, temperature, and other parameters in the water to evaluate quality and activity of the water. The advantages of the terahertz water quality activator are non-contact, destructiveness, high sensitivity, and high resolution, it can enable real-time, rapid, and comprehensive detection and treatment of water, it is suitable for multiple fields such as sewage treatment, drinking water purification, agricultural irrigation, and aquaculture.

However, traditional terahertz water quality activators mostly only have the function of adding activity to water flow in a practical use, without disinfection equipment. Therefore, after activating the water flow, other disinfection equipment still needs to be used to disinfect the water flow, which may bring great inconvenience to a user and lead to poor practicality of the terahertz water quality activators.

Therefore, technicians in this field have provided a terahertz water quality activator to address the issues raised in the background technology.

SUMMARY

The purpose of the present disclosure is to address the shortcomings of existing technologies and propose a terahertz water quality activator. In an actual use, to-be-purified water is first poured into an interior of a water storage tank by a user, then a terahertz signal is emitted to an interior of water flow by starting a terahertz transmitter, thereby changing microstructure of the water flow, and improving its physical and chemical properties. At the same time, quality and activity of the water can also be evaluated. Meanwhile, a power plug, in combination with a power cord, transfers current through a connector to a heating plate, thereby heating and disinfecting the water flow in the water storage tank, further improving a purification efficiency of the terahertz water quality activator, and enhancing its practicality.

To achieve the above objectives, the present disclosure provides the following technical solutions.

A terahertz water quality activator including a heating base and a top cover, a middle of an upper surface of the heating base is fixedly connected to a water storage tank, a middle of an inner bottom surface of the water storage tank is fixedly connected to a heating plate, an interior of the heating plate is fixedly connected to a heating wire, a middle of an inner wall of the heating base is provided with a connector, an upper surface of the connector is fixedly connected to a lower surface of the heating plate;

a middle of an upper surface of the top cover is fixedly connected to an installation block, an upper surface of the installation block is fixedly connected to a manipulator, outer walls on two sides of the manipulator are provided with an air outlet, an inner wall of the air outlet is fixedly connected to a filter.

Through the above technical solution, a user can observe heating in the water storage tank through the observation window during an actual use. At the same time, a sealing of the activator during operation is ensured through a clamp fit between the clamp block and the clamp slot. Furthermore, the temperature sensor and the temperature display board cooperate with each other, rendering it easier for the user to grasp temperature of the water flow in the activator and use it conveniently.

In an embodiment of the present disclosure, a clamp slot is provided on an upper surface of the water storage tank, a clamp block is fixedly connected to a lower surface of the top cover; the clamp block is clamped and matched with the clamp slot.

Through the above technical solution, the sealing between the top cover and the water storage tank is ensured through the clamp fit between the clamp block and the clamp slot, which further ensures the sealing of the activator during operation.

In an embodiment of the present disclosure, a power cord is provided in a middle of an outer wall on one side of the heating base, a power plug is fixedly connected to an outer wall on one side of the power cord.

Through the above technical solution, the power cord is combined with a power plug to facilitate power supply of the connector, thereby supplying power to the heating plate, and achieving a purpose of heating and disinfecting water flow in the water storage tank.

In an embodiment of the present disclosure, a handle is fixedly connected to one side of a middle of a front outer wall of the water storage tank, an observation window is provided in a middle of the front outer wall on one side of the water storage tank away from the handle.

Through the above technical solution, it is convenient for the user to use the activator through the handle, and through the observation window, it is convenient for the user to know an internal situation of the activator during operation.

In an embodiment of the present disclosure, a temperature display board and a power switch are respectively provided on an upper surface of the manipulator, a temperature sensor is fixedly connected to an upper of an inner wall of the water storage tank.

Through the above technical solution, the temperature display board and temperature sensor are used to facilitate the user to know a specific temperature in the water storage tank, and power switch is used to facilitate the user to use the activator.

In an embodiment of the present disclosure, a charging port is provided in a middle of a front outer wall of the manipulator, a battery is provided in a middle of an inner bottom surface of the manipulator.

Through the above technical solution, it is convenient to charge the battery through the charging port to ensure its normal use.

In an embodiment of the present disclosure, the charging port is electrically connected to the battery.

Through the above technical solution, the electrical connection between the charging port and the battery ensures a stability during charging.

In an embodiment of the present disclosure, a terahertz emitter is fixedly connected to a middle of the lower surface of the top cover.

Through the above technical solution, the activator can improve the quality and activity of water flow by transmitting terahertz signals through the terahertz transmitter.

The present disclosure has the following beneficial effects:

1. The present disclosure proposes a terahertz water quality activator. Compared with existing terahertz water quality activators, the terahertz water quality activator first requires the user to pour to-be-purified water into the interior of the water storage tank, and then emits a terahertz signal to the interior of the water flow by starting the terahertz transmitter, thereby changing the microstructure of the water flow, improving the physical and chemical properties of the water flow, and also evaluating the quality and activity of the water. At the same time, the power plug, in combination with the power cord, the current is transferred to the heating plate above the connector, thereby heating and disinfecting the water flow in the water storage tank, further improving the purification efficiency of the terahertz water quality activator, and enhancing its practicality.
2. The present disclosure proposes a terahertz water quality activator. Compared with existing terahertz water quality activators, the terahertz water quality activator allows the user to observe the heating in the water storage tank through the observation window during an actual use. At the same time, the sealing of the activator during operation is ensured through the clamp fit between the clamp block and the clamp slot. Furthermore, the temperature sensor and the temperature display board cooperate with each other, rendering it easy for the user to grasp temperature of water flow in the activator, thereby facilitating the use of the activator.

NUMERAL REFERENCE

1. Heating base; 2. Water storage tank; 3. Top cover; 4. Power cord; 5. Power plug; 6. Observation window; 7. Handle; 8. Clamp slot; 9. Clamp block; 10. Installation block; 11. Manipulator; 12. Temperature display board; 13. Power switch; 14. Charging port; 15. Temperature sensor; 16. Heating plate; 17. Heating wire; 18. Connector; 19. Terahertz transmitter; 20. Battery; 21. Air outlet; 22. Filter.

DESCRIPTION OF EMBODIMENTS

The following will provide a clear and complete description of the technical solution in the embodiments of the present disclosure, in combination with the accompanying drawings. Obviously, the described embodiments are only a part of the embodiments of the present disclosure, not all of them. Based on the embodiments in the present disclosure, all other embodiments obtained by ordinary technical personnel in this field without creative work fall within the protection scope of the present disclosure.

Figure 1:
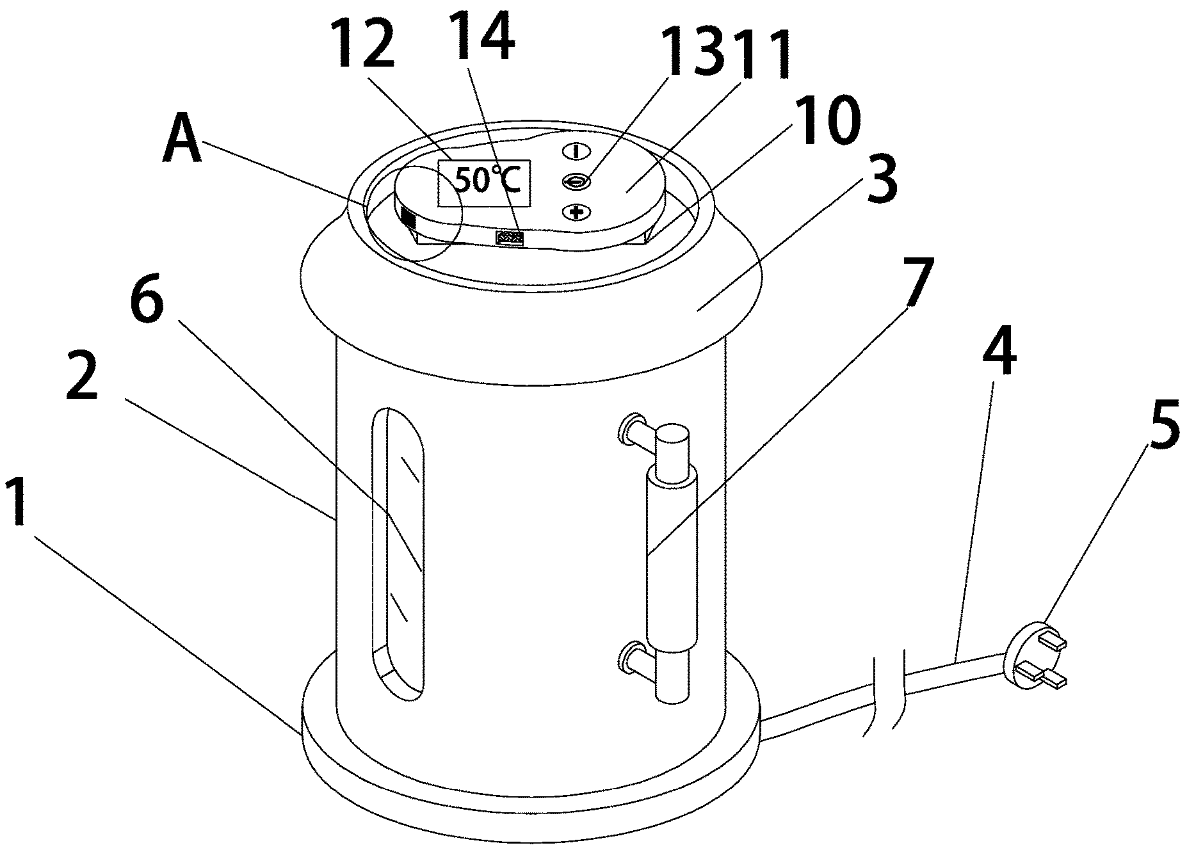
FIG. 1 is an axonometric diagram of a terahertz water quality activator proposed by the present disclosure.
Figure 2:
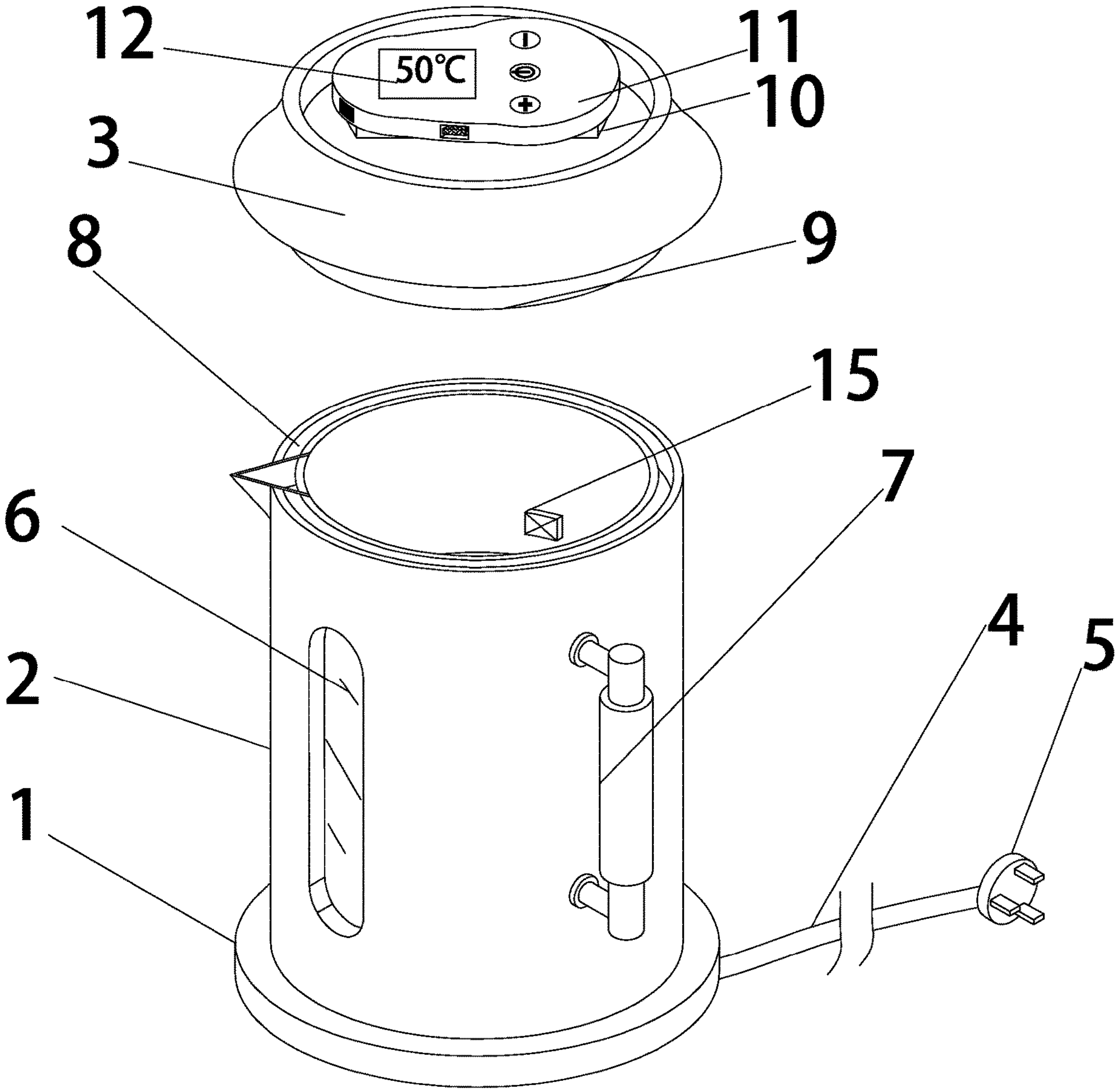
FIG. 2 is a schematic structural diagram of the terahertz water quality activator proposed by the present disclosure.
Figure 3:
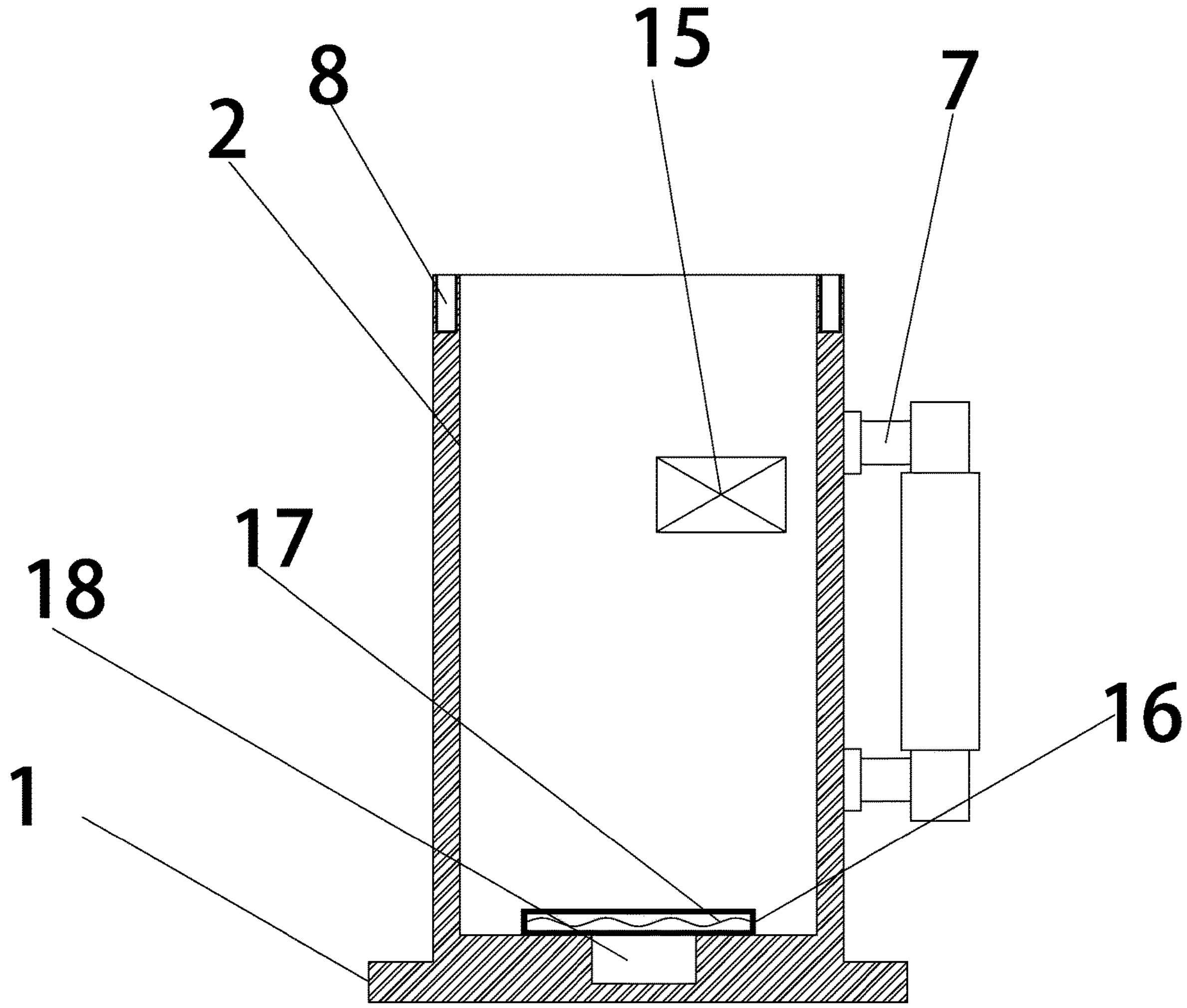
FIG. 3 is a cross-sectional view of a heating base and a water storage tank of the terahertz water quality activator proposed in the present disclosure.
Figure 4:
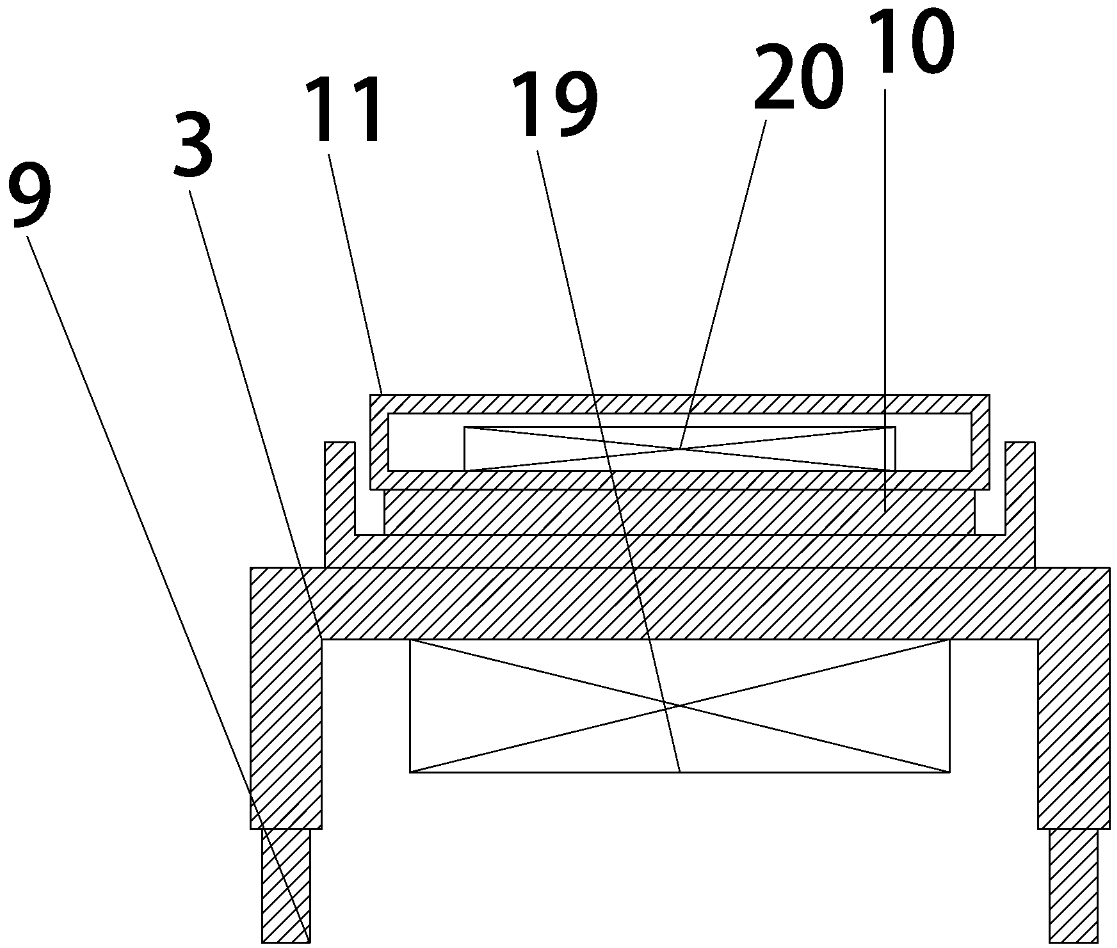
FIG. 4 is a cross-sectional view of a top cover of the terahertz water quality activator proposed by the present disclosure.
Figure 5:
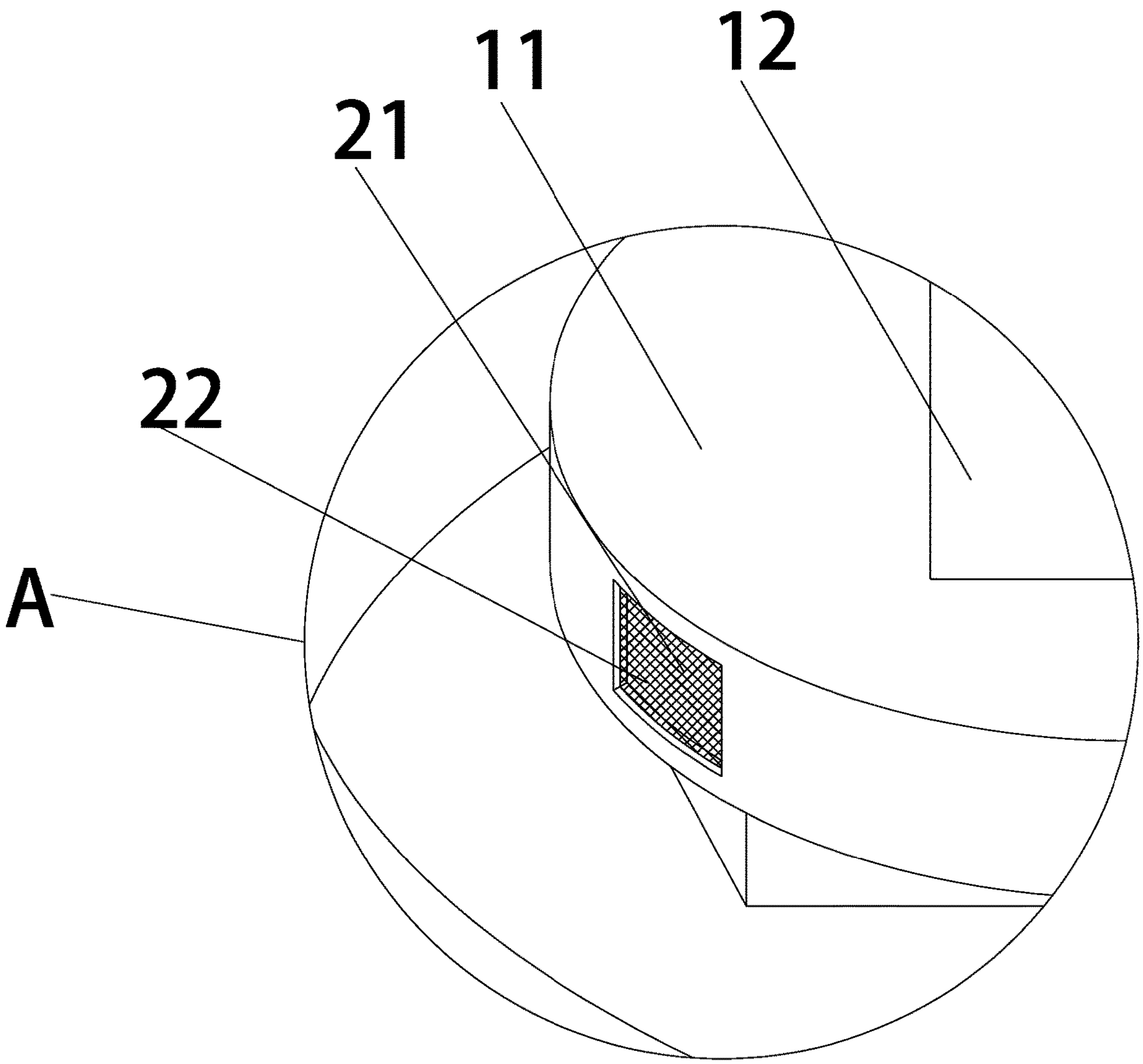
FIG. 5 is an enlarged view of location A in FIG. 1.

Referring to FIGS. 1-5, an embodiment provided by the present disclosure provides a terahertz water quality activator, including a heating base 1 and a top cover 3. A middle of an upper surface of the heating base 1 is fixedly connected to a water storage tank 2, a middle of an inner bottom surface of the water storage tank 2 is fixedly connected to a heating plate 16, an interior of the heating plate 16 is fixedly connected to a heating wire 17, a middle of an inner wall of the heating base 1 is provided with a connector 18. An upper surface of the connector 18 is fixedly connected to a lower surface of the heating plate 16.

A middle of an upper surface of the top cover 3 is fixedly connected to an installation block 10, an upper surface of the installation block 10 is fixedly connected to a manipulator 11. Outer walls on two sides of the manipulator 11 are provided with an air outlet 21, an inner wall of the air outlet 21 is fixedly connected to a filter 22.

In an actual use, to-be-purified water is firstly poured into an interior of the water storage tank 2 by a user, a terahertz transmitter 19 is stated to emit a terahertz signal to an interior of water flow, thereby changing microstructure of the water flow and improving its physical and chemical properties. At the same time, quality and activity of the water can also be evaluated. Meanwhile, a power plug 5, in combination with a power cord 4, transfers current through a connector 18 to the heating plate 16 above, thereby heating and disinfecting the water flow in the water storage tank 2, further improving purification efficiency of the terahertz water quality activator and enhancing its practicality.

An upper surface of the water storage tank 2 is provided with a clamp slot 8, a lower surface of the top cover 3 is fixedly connected with a clamp block 9. The clamp block 9 is in a clamp fit with the clamp slot 8. Through the clamp fit between the clamp block 9 and the clamp slot 8, a sealing of the top cover 3 that is connected to the water storage tank 2 is ensured, further ensuring the sealing of the activator during operation. A power cord 4 is provided in a middle of an outer wall on one side of the heating base 1, an outer wall on one side of the power cord 4 is fixedly connected to a power plug 5. The power cord 4 is matched with the power plug 5 to facilitate power supply of the connector 18, and then the heating plate 16 is powered to achieve the heating and disinfection of the internal water flow in the water storage tank 2. A handle 7 is provided on a middle of one side of a front outer wall of the water storage tank 2, an observation window 6 is provided in a middle of the front outer wall on one side of the water storage tank 2 away from the handle 7. Through the handle 7, it is convenient for the user to use the activator. Through the observation window 6, it is convenient for the user to know an internal situation of the activator during operation. An upper surface of the manipulator 11 is respectively provided with a temperature display board 12 and a power switch 13. An upper of an inner wall of the water storage tank 2 is fixedly connected to a temperature sensor 15, the temperature display board 12 and the temperature sensor 15 are used to facilitate the user to know a specific temperature in the water storage tank 2. The power switch 13 is used to facilitate the user to use the activator. A middle of an outer wall of the front end of manipulator 11 is provided with a charging port 14, a middle of an inner bottom of the manipulator 11 is provided with a battery 20. The charging port 14 is electrically connected to the battery 20 to ensure a normal use of the battery 20. The charging port 14 is electrically connected to the battery 20, a stability during charging is ensured by the electrical connection between the charging port 14 and the battery 20. A middle of a lower surface of the top cover 3 is fixedly connected to a terahertz transmitter 19, which facilitates the activator to emit terahertz signals and improve the quality and activity of the water flow.

Working principle: when the terahertz water quality activator is used in practice, the to-be-purified water is firstly poured into the interior of the water storage tank 2 by the user, then the terahertz transmitter 19 is started to emit a terahertz signal to the interior of the water flow, thereby changing the microstructure of the water flow and improving its physical and chemical properties. At the same time, it can also evaluate the quality and activity of the water. Meanwhile, the power plug 5, in combination with the power cord 4, transfers the current through the connector 18 to the heating plate 16 above, thereby heating and disinfecting the water flow in the water storage tank 2. The user can observe the heating situation in the water storage tank 2 through the observation window 6, ensure the activation by the clamp fit between the clamp block 9 and the clamp slot 8. The sealing of the activator during operation is achieved through the cooperation between temperature sensor 15 and temperature display board 12, rendering it easier for the user to grasp the temperature of the water flow in the activator.

Finally, it should be noted that the above is only a preferred embodiment of the present disclosure and is not intended to limit the present disclosure. Although the present disclosure has been described in detail with reference to the embodiments, it is still possible for those skilled in the art to modify the technical solutions recorded in the embodiments or to equivalently substitute some of the technical features. Any modifications, equivalent substitution improvements, etc. made within the spirit and principles of the present disclosure should be included in the protection scope of the present disclosure.

What is claimed is:

1. A terahertz water quality activator, comprising: a heating base and a top cover, wherein a middle of an upper surface of the heating base is fixedly connected to a water storage tank, a middle of an inner bottom surface of the water storage tank is fixedly connected to a heating plate, an interior of the heating plate is fixedly connected to a heating wire, a middle of an inner wall of the heating base is provided with a connector, an upper surface of the connector is fixedly connected to a lower surface of the heating plate;

a middle of an upper surface of the top cover is fixedly connected to an installation block, an upper surface of the installation block is fixedly connected to a manipulator, outer walls on two sides of the manipulator are provided with an air outlet, an inner wall of the air outlet is fixedly connected to a filter;

wherein a terahertz emitter is fixedly connected to a middle of a lower surface of the top cover.

2. The terahertz water quality activator according to claim 1, wherein a clamp slot is provided on an upper surface of the water storage tank, a clamp block is fixedly connected to the lower surface of the top cover; the clamp block is clamped and matched with the clamp slot.

3. The terahertz water quality activator according to claim 1, wherein a power cord is provided in a middle of an outer wall on one side of the heating base, a power plug is fixedly connected to an outer wall on one side of the power cord.

4. The terahertz water quality activator according to claim 1, wherein a handle is fixedly connected to one side of a middle of a front outer wall of the water storage tank, an observation window is provided in a middle of the front outer wall on one side of the water storage tank away from the handle.

5. The terahertz water quality activator according to claim 1, wherein a temperature display board and a power switch are respectively provided on an upper surface of the manipulator, a temperature sensor is fixedly connected to an upper of an inner wall of the water storage tank.

6. The terahertz water quality activator according to claim 1, wherein a charging port is provided in a middle of a front outer wall of the manipulator, a battery is provided in a middle of an inner bottom surface of the manipulator.

7. The terahertz water quality activator according to claim 6, wherein the charging port is electrically connected to the battery.

* * * * *